A. KADOW.
GLASS FORMING MACHINE.
APPLICATION FILED JAN. 11, 1917.

1,251,671. Patented Jan. 1, 1918
10 SHEETS—SHEET 1.

FIG. 1.

INVENTOR.
August Kadow
by
Barnett & Newman
ATTORNEYS.

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

GLASS-FORMING MACHINE.

1,251,671.            Specification of Letters Patent.        Patented Jan. 1, 1918.

Application filed January 11, 1917. Serial No. 141,885.

*To all whom it may concern:*

Be it known that I, AUGUST KADOW, a citizen of the United States, residing at Toledo, in the county of Lucas and State of Ohio, have invented certain new and useful Improvements in Glass-Forming Machines, of which the following is a specification.

My invention relates to apparatus for manufacturing glass articles, and more particularly to the portions of such apparatus employed for gathering the glass from the furnace in the form of blanks of suitable size and shape for subsequent treatment by blowing or otherwise.

The glass gathering mechanism of my invention is designed, in particular, for use in connection with a machine of the type shown in my co-pending application Serial No. 570,621, filed July 6, 1910, which comprises a rotary support carrying, in radial arrangement, a plurality of sets of glass forming elements adapted to be successively brought in front of the working opening of the furnace, each set having its own glass gathering mechanism, or ram, as it has been termed, which, by a radial movement, is projected into the working opening of the furnace, gathers a measured quantity of glass therefrom and delivers the same in the form of a blank to the "spindle" constituting part of each set of glass forming mechanisms.

One of the principal objects of the present invention is to obviate the inconvenience and expense incident to a multiplicity of gathering devices, or rams, by providing a single gathering mechanism, preferably having no rotary movement, which moves back and forth to and from the furnace and is timed so as to deliver successive gathers to the rotating spindles as the latter are brought into alinement with its gathering mold, or molds.

In a machine operating on this principle, an important consideration, particularly where the operations are carried on at a relatively high speed so as to give maximum output, is to prevent overheating that portion of the gathering mechanism, particularly the mold and parts adjacent thereto which is projected into the furnace. My present invention provides means, operative between successive forward excursions of the gathering device, for effectively cooling the parts thereof which come into contact with the molten glass or are subjected to the heat of the furnace.

The invention also provides means for shielding the glass gathering mechanism from the heat from the working opening of the furnace during the time it is subjected to the air or other cooling fluid employed for reducing the temperature of those of its parts particularly liable to overheating.

A further object is to increase the output of a machine of this general type by providing means whereby a plurality of gathers may be made at one time, for example, whereby two or more blanks may be gathered, formed and delivered to a corresponding number of spindles, or other glass forming mechanisms, at one excursion of the ram or gathering device.

The invention consists in the new and improved constructions, arrangements and devices, to be hereinafter described and claimed, for carrying out the above stated objects and such other objects as will appear in the following description of the preferred embodiment of the invention shown in the drawings appended hereto.

In the drawings.

Like characters of reference designate like parts in the several figures of the drawings.

The constructions constituting my present invention are shown in a machine which, broadly speaking, is of the same type as the glass forming machine disclosed in my pending application above identified. This machine has been in general use for some little time and its construction and operation are known to those skilled in this art. Therefore, it will be sufficient to illustrate and describe such parts only of the apparatus as have a direct bearing upon the improvements here concerned, and this is desirable inasmuch as the complete machine is very large and comprises a number of complicated mechanisms having no direct relation with the gathering of the glass. For the sake of clearness I will preface the detailed description of the devices and mechanisms herein shown with a general statement as to the construction and operation of the machine as a whole. It will be understood, however, that my invention is not limited to the particular type of apparatus referred to, being susceptible of use in connection with other glass forming apparatuses where analogous operations are to be performed.

The machine herein shown comprises a rotating structure which supports a plurality of glass forming elements, in radial arrangement with reference to the axis of rotation of said structure, which are adapted to receive and operate upon the blanks successively gathered and formed by a single gathering mechanism which, in this particular embodiment of the invention, has no movement of rotation but reciprocates, radially of the machine, in and out of the working opening of the furnace. The gathering mechanism, or ram, is preferably provided with two gathering molds which gather and form the blanks and deliver them in pairs to the glass forming elements. Each set of glass forming mechanism comprises a pair of spindles, which receive the blanks and form them simultaneously into the finished articles by a series of operations which, so far as the present invention is concerned, do not require description.

The gathering operation is performed by suction controlled by automatic mechanism. The reciprocating movements of the ram are effected by means of a rotary cam. The ram slides upon a stationary support arranged in line with the working opening of the furnace and this support is provided with means for shielding the ram, and its gathering molds, from the heat of the furnace, when the ram is retracted, and for directing jets of cooling fluid against the end of the ram, and particularly against the exterior and interior of the mold sections. Associated with the ram are automatic mechanisms for opening and closing the molds and for cutting off the surplus glass from the gathering openings as the ram is withdrawn from the furnace.

Figures 5, 6:
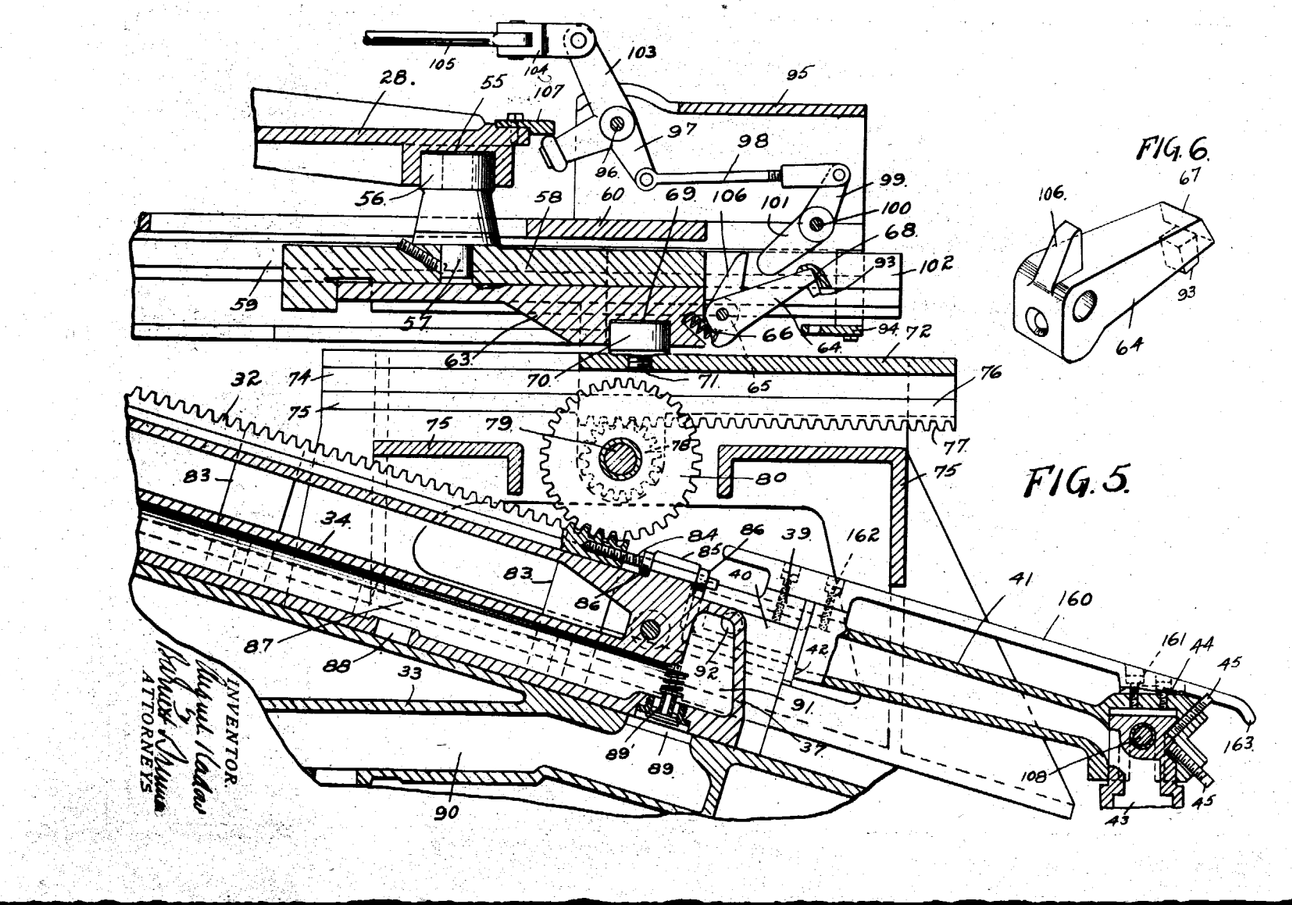
Fig. 5 is a detail radial section illustrating particularly the mechanism for reciprocating the ram.
Fig. 6 is a view, in perspective, of the locking dog employed for stopping the operation of the gathering mechanism without arresting the movement of the machine as a whole.
Figures 9, 10:
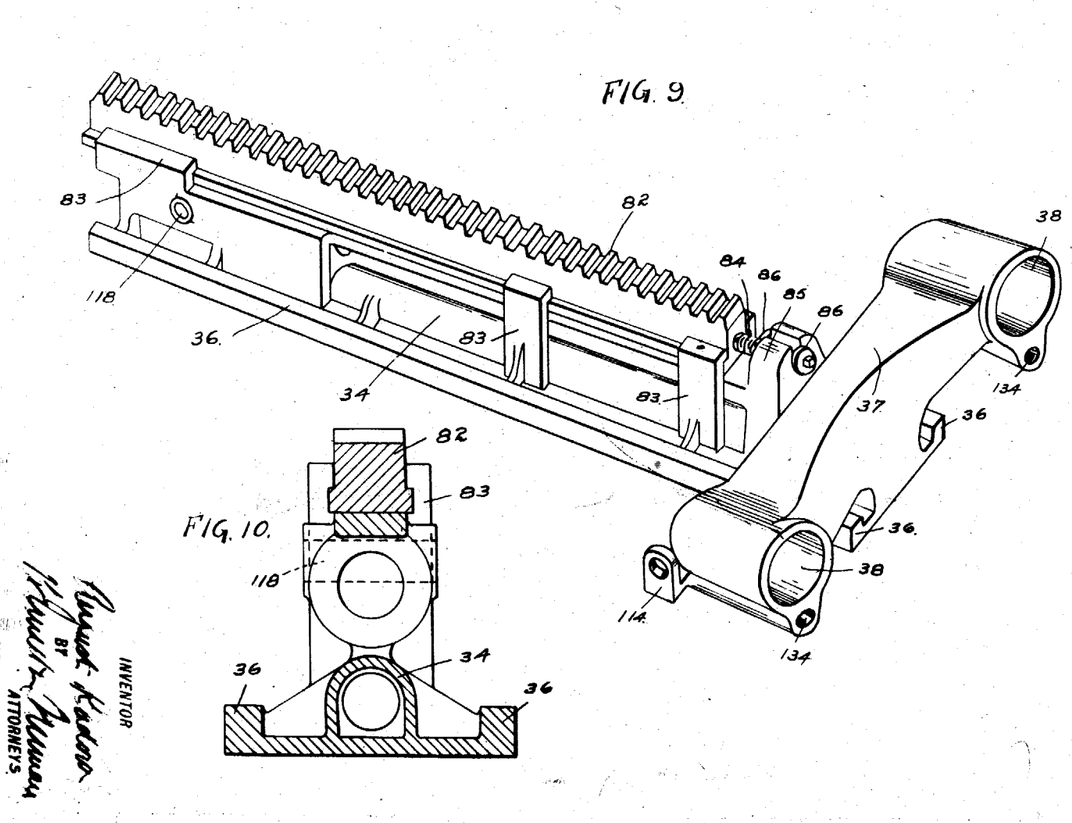
Fig. 9 is a view, in perspective, of the ram, omitting the gathering molds and their supports.
Fig. 10 is a cross sectional view taken on line 10—10 of Fig. 9.

Referring now to the drawings, the rotating structure supporting the glass forming mechanisms is shown at 25. 26 (Fig. 1) is one of the pair of spindles forming part of one of these glass forming mechanisms. 27 is a central hollow column to which is keyed a cam 28 designed to effect the reciprocal movements of the ram. In the preferred form of the invention shown, cam 28 rotates faster than the rotating structure 25, the ratio corresponding to the number of glass forming mechanisms carried by the latter; that is, cam 28 rotates once for each movement in and out of the ram. 29 is a stationary drum surrounding the column 27. Secured by bolts 30 to the drum is a hollow structure 31 formed with a bracket 32 to which is fixed a supporting member 33 for the ram 34. The upper surface of the ram support 33 has a downward inclination, outwardly of the machine, and is formed with an undercut guideway 35 for the ram, the lower portion 36 of which forms a slide adapted to fit said guideway. The ram terminates at its outer end in a transverse head 37 (Fig. 9) formed at opposite extremities with openings 38, 38, in which are secured, by set screws 39, the diminished ends 40 of a pair of tubular members 41, 41ª carrying at their outer ends the molds to be hereinafter described, the tubular members being formed with shoulders 42 which abut against the head 37.

Figure 2:
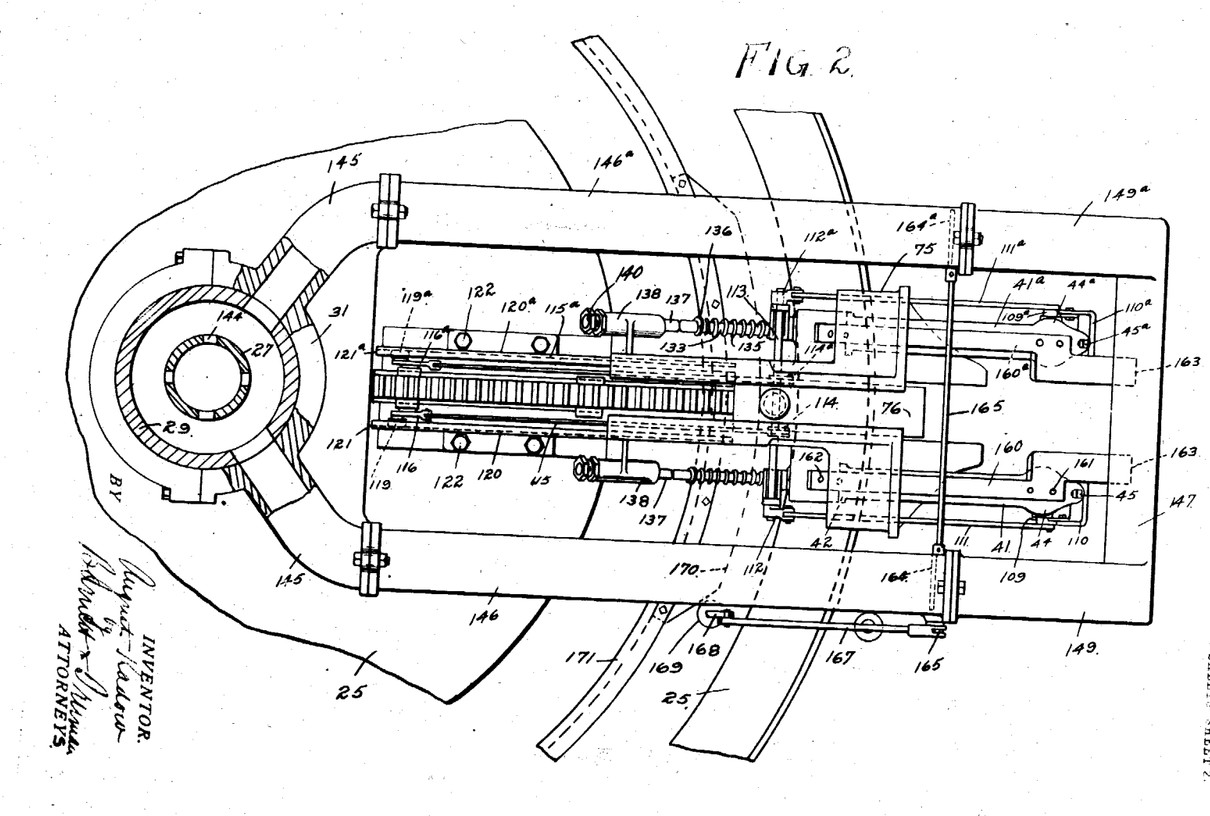
Fig. 2 is a plan view of the portion of the machine shown in Fig. 1.

The molds are preferably of identical construction and the mechanisms for opening and closing them and for shearing off the surplus glass are alike so that it will be sufficient to describe one of these molds and the mechanisms associated therewith. The group of such mechanisms to be described is that employed in connection with the mold shown in the lower part of the plan view (Fig. 2). Where it is necessary to refer to the other group the corresponding parts will be designated by corresponding reference numerals given the exponent $a$.

The mold comprises an upper mold section 43 (Fig. 7) fixed in the head 44 of tubular member 41 by set screws 45, and of a lower mold section 46 which is provided with an arm 47 hinged by a pintle 48 to a bracket 49 formed on the upper mold section. The lower mold section has a gathering opening 50 in the bottom thereof.

51 indicates the glass furnace having a working opening 52. 53 is the usual ring which floats on the body of molten glass 54 in the furnace.

The ram, with its gathering molds, is thrust into and withdrawn from the furnace by the following mechanism: Arranged in the cam groove 55 of the rotating cam 28 is a roller 56 which is mounted on a stud 57 on a slide 58 which is supported in guideways 59 formed on the under side of a bracket 60 which is fixed to a boss 61 formed on the stationary structure 29 above mentioned. Arranged in the guideway 62, formed on the under side of the slide 58, is a locking slide 63 which, in the normal operation of the machine, is held in rigid relation with the slide 58 by means of a locking dog 64 (Figs. 5 and 6) which is pivoted to a bracket 65 on the end of slide 63 and held by means of a coiled spring 66 with its nose 67 engaging a notch 68 in the under surface of the upper slide 58. Slide 63 is formed with a cam groove 69 to receive a roller 70 mounted on a stud 71 fixed to a slide 72. Slide 72 is formed with lateral projections 73 that enter guideways 74 formed in opposite sides of a housing 75 resting upon and secured to the ram support 33. The slide 72 is provided with depending webs 76 which are formed with toothed racks 77 adapted to mesh with a pinion 78 rotating on a shaft 79 supported in the housing 75. On this shaft is a larger pinion 80 projecting into the space 81 between the webs 76 of slide 72. The pinion 78 extends through and projects beyond the opposite faces of pinion 80 to which it is keyed. The pinion 80 meshes with a rack 82 slidably arranged between lugs 83 formed on the ram 34, the rack being held in fixed position, but adjustably, by a set screw 84 revolubly mounted in a lug 85 on the ram and held against endwise movement through the lug by collars 86 (Fig. 9).

When roller 56 is forced inwardly by cam 28, the ram is thrust in the opposite direction and enters the working opening 52 of the furnace. Further rotation of the cam moves the roller outwardly and toward the position shown in Fig. 5, which operates to retract the ram from the furnace.

When the ram is in its extended position (Fig. 4) so that it projects into the furnace, the lower mold section is held up against the upper or fixed mold section, by mechanism which will be hereinafter described, and glass from the furnace is drawn up into the mold through the gathering opening 50 in the bottom of the lower mold section. This is accomplished by suction.

The ram 34 is formed with a hollow space 87 communicating by port 88 with a port 89 (Fig. 5) leading to a hollow space 90 in the ram support 33. The low pressure established in space 90 is created and controlled by any suitable exhausting apparatus (not shown). The space 87 in the ram communicates with the interior of the hollow mold supports 41, 41$^a$ through a space 91 formed in head 37 and ports 92 leading to openings 38 in the head (Fig. 5). 89' is a valve communicating at times with port 89 and opening inwardly toward space 90. The purpose of the valve is explained fully in my co-pending application Serial No. 570,621 and has no direct bearing upon the invention herein disclosed.

The purpose of the locking slide 63 is to enable the gathering operation to be arrested without stopping the other movements of the machine. The locking dog 64 has a lip 93 adapted to be engaged with a perforated bracket 94 depending from the stationary member 60 which supports slide 58. On the upper side of this member is a housing 95 in which is pivoted on shaft 96 a three-armed lever, one arm 97 of which is connected by a link 98 with a bell crank lever 99 pivoted at 100 to the housing, the other arm 101 of which projects into a slot 102 in the slide 58. The arm 103 of the three-armed lever is connected by a link 104 with a pull rod 105, moved by mechanism which need not be described, so as to rock the arm 101 of the bell crank lever against dog 64, when the slides are in the position shown in Fig. 5, so as to force the locking dog out of engagement with the upper slide 58 and into locking engagement with the perforated bracket 94. This permits the upper slide 58 to move independently of the lower slide 63, thereby disengaging the ram-actuating mechanism from the cam-operated slide 58. The disengagement of the locking dog 64 from bracket 94 is accomplished by rocking the free end 101 of the bell crank lever against a projection 106 on the locking dog. 107 is a guide plate on cam 28 which prevents the movement of the three-armed lever and thereby the engagement or disengagement of slides 63 and 58 except at such times as these operations can be safely accomplished.

The surplus metal is sheared off from the gathering openings of the molds by the following mechanism: Pivoted to the heads 44 of the mold carrying members 41, 41ª, at 108, are rocking devices 109, 109ª carrying shearing knives 110. The rocking devices are connected by links 111, 111ª to arms 112, 112ª rigidly secured to a rock shaft 113 mounted for rotation in ears 114 (Fig. 9) formed on the head 37. The rock shaft 113 is provided with another pair of rigid arms 114, 114ª connected by links 115, 115ª with bell cranks 116, 116ª secured to a rock shaft 117 extending through an opening 118 (Fig. 9) in the ram 34. The free ends of the bell cranks carry rollers 119, 119ª running in camways 120, 120ª formed on members 121, 121ª bolted to the ram support 33 by bolts 122. The movement of the ram in the direction away from the furnace rocks the bell cranks 116, 116ª so as to carry the knives 110, 110ª under the gathering openings in the molds so that they shear off any excess glass. A further movement inwardly of the ram returns the knives to their normal position. The links 115, 115ª are preferably telescopic in their construction. Each of these links is preferably made up of two sections 123, 124, the former entering a sleeve 125 fixed on the end of the latter and being provided with a transverse pin 126 extending through a slot 127 in the sleeve. 128 is a spring secured at one end to sleeve 125 and at the other to a collar 126' on link section 123. This arrangement allows the link, designated as a whole 115, to be extended in case the knife which it operates meets with resistance sufficient to overcome the force of spring 128, thereby preventing injury to the mechanism if such conditions should arise.

The mechanism for opening and closing each of the molds is as follows: The arm 47 of the lower mold section 46 is provided with a pin 129 engaged by a fork 130 on the end of a link 131 connected by link 132 with a plunger 133 which has a bearing in the opening 134 in the ram head 37 just below opening 38. A coiled spring 135 is interposed between the head 37 and a collar 136 on plunger 133. The plunger 133 is arranged in line with an abutment 137 slidably positioned in a casing 138 fixed to the ram support 33, the casing being preferably provided with a bushing 139 threaded for longitudinal adjustment in the casing (Fig. 3), the inner end of which is interiorly threaded to receive a spring abutment 140 between which and abutment 137 is arranged a coiled spring 141 which is stiffer than spring 135. The bushing has a head 142 against which the head 143 on abutment 137 normally bears. The spring 141 is a safety contrivance to prevent injury in case the lower mold section for any reason should fail to operate. In such event spring 141 will yield.

Figure 3:
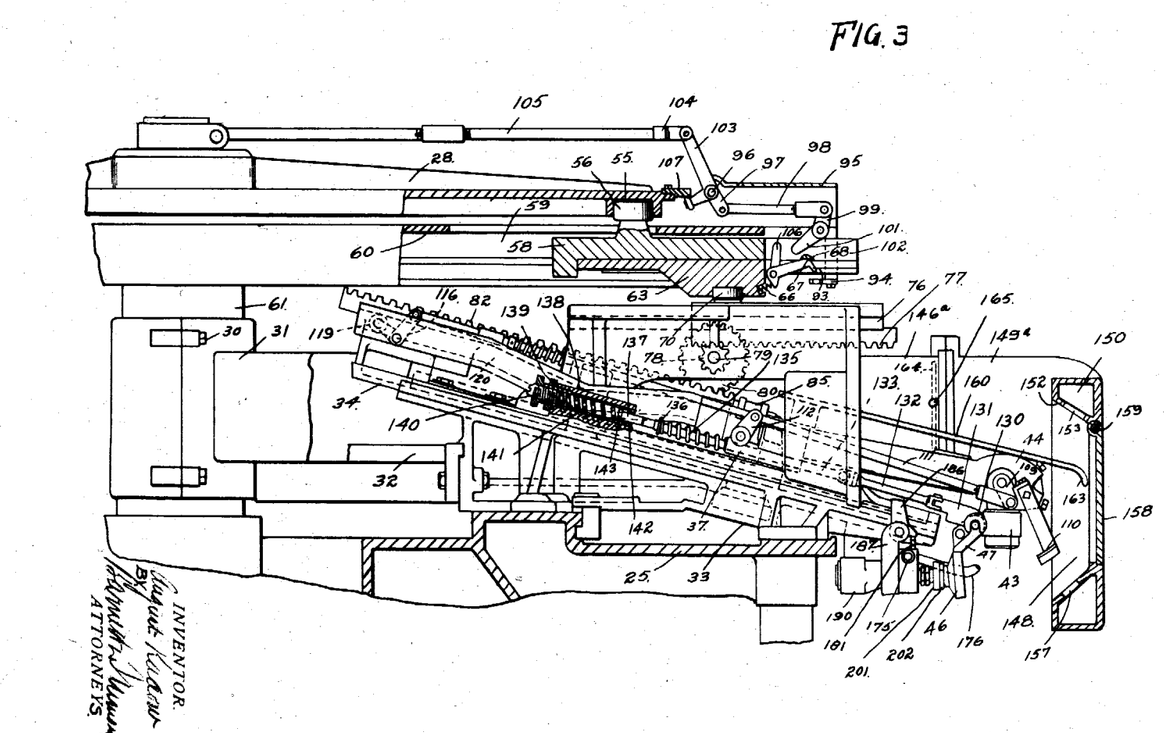
Fig. 3 is a fragmentary, radial, sectional view taken through the gathering mechanism and associated parts of the machine.

With the parts in the position shown in Fig. 3 both springs are under compression which operates to force the lower mold section to its open position. When the ram moves outwardly toward the furnace spring 135 expands so as to force the lower mold section up against the upper mold section, after which plunger 133 moves away from the spring-pressed abutment 137 which resumes its normal position. The adjustment of bushing 139 is for the purpose of positioning the abutment 137. The adjustment of adjusting screw 140 is to vary the spring pressure created when the plunger moves inwardly to open the mold.

Figure 1:
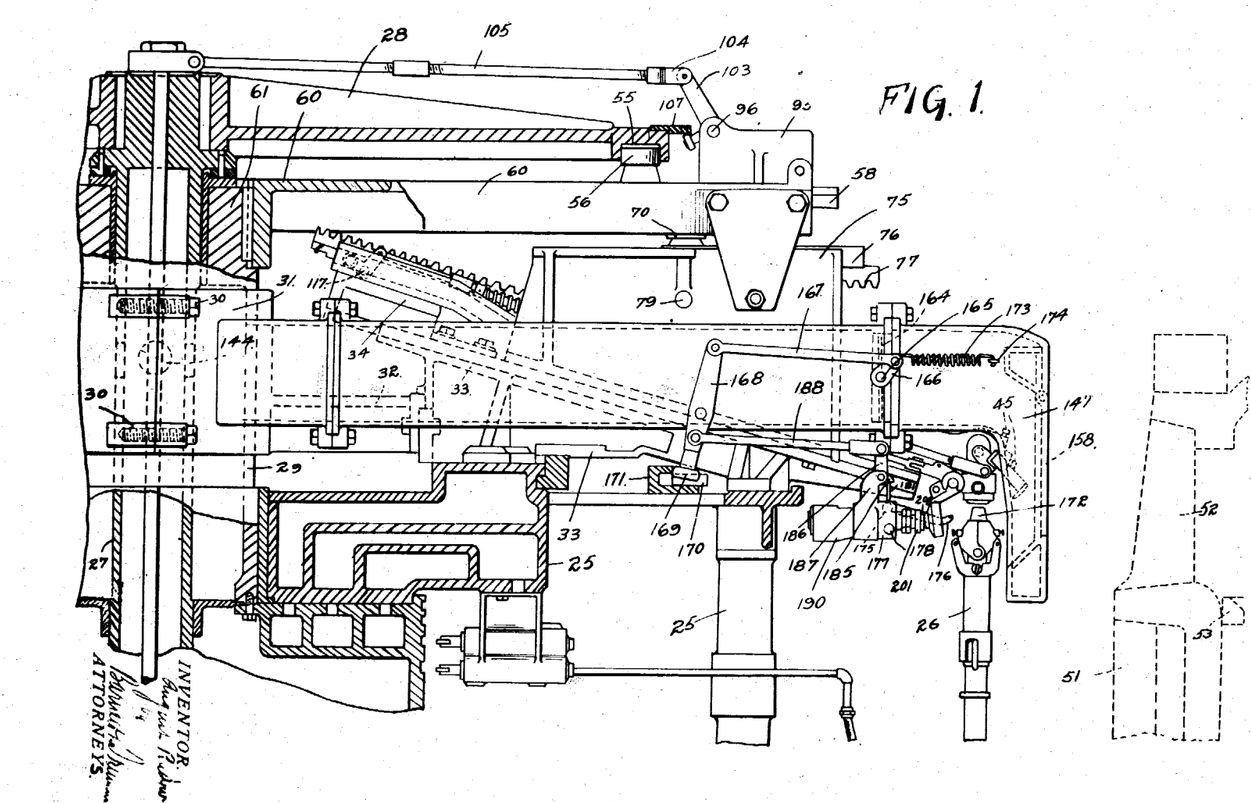
Figure 1 is a fragmentary side elevation of a glass forming machine, certain parts being in section, illustrating particularly the glass gathering mechanism and such contiguous parts of the machine as are necessary for the understanding of the invention here concerned.
Figure 11:
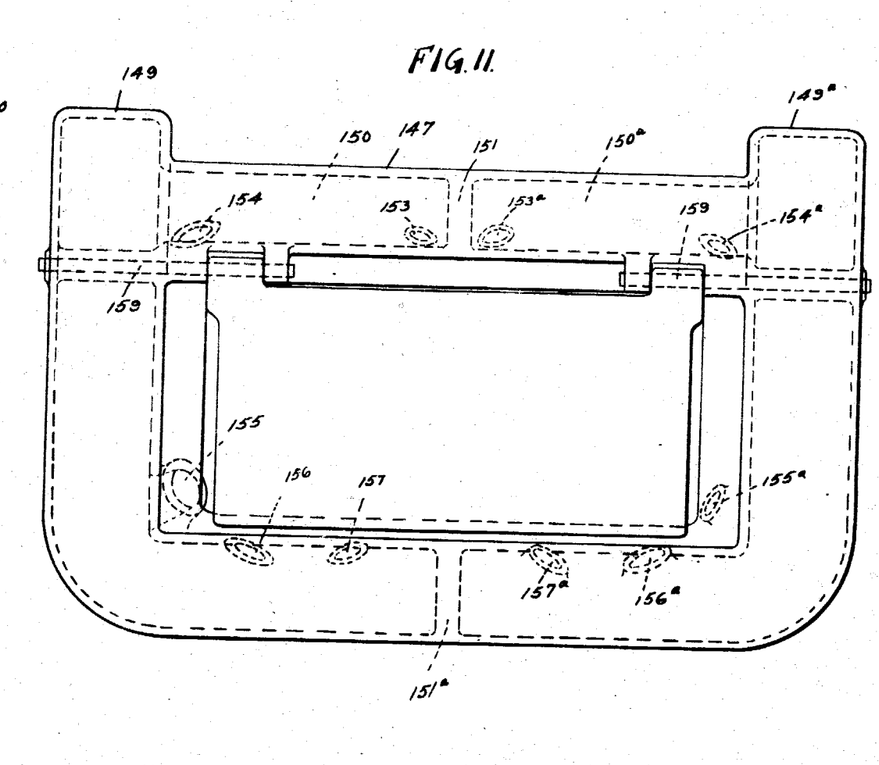
Fig. 11 is a front elevation, and Fig. 12 a fragmentary side elevation of the shielding structure which protects the gathering device from the heat of the furnace, when said gathering device is withdrawn from said furnace, this structure also providing the means, in part, for subjecting the end of the gathering mechanism to jets of cooling fluid, for example, air, when the gathering device is in its retracted position.
Figure 12:
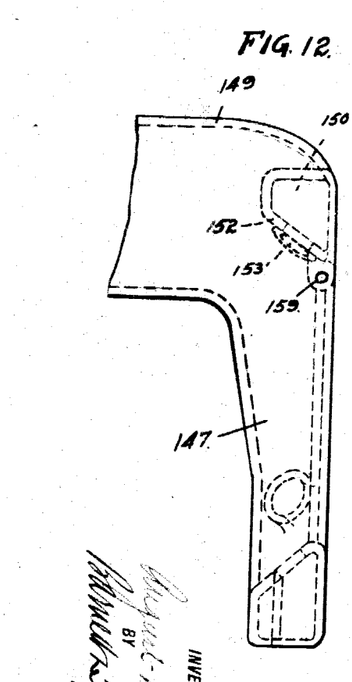

The mechanism for cooling the outer end of the ram and its molds will be next described. The hollow central column 27 of the machine provides an air space which is kept filled with air under pressure by any suitable means (not shown). The fixed hollow structure 31, which surrounds the rotating column 27, communicates therewith through openings 144 in the latter (Fig. 1). The forward section of structure 31 is formed with tubular projections 145 to which are connected air trunks 146, 146ª (Fig. 2) leading to and supporting a substantially vertically disposed, hollow, annular structure 147 (Figs. 11 and 12), such structure being so placed that the ram moves back and forth through its central opening 148. The hollow annular structure is formed with tubular projections 149, 149ª for attachment to air trunks 146, 146ª, and the interior thereof is divided into two air spaces 150, 150ª by partitions 151, 151ª. The inner bounding wall 152 of the structure is preferably inclined or formed on a bevel and provided with apertures 153, 154, 155, 156, 157, 153ª, 154ª, 155ª, 156ª and 157ª, which apertures are so disposed that one set of them directs jets of air against one of the molds and adjacent parts of the ram, and the other set against the other mold and the parts of the ram adjacent thereto.

Figure 4:
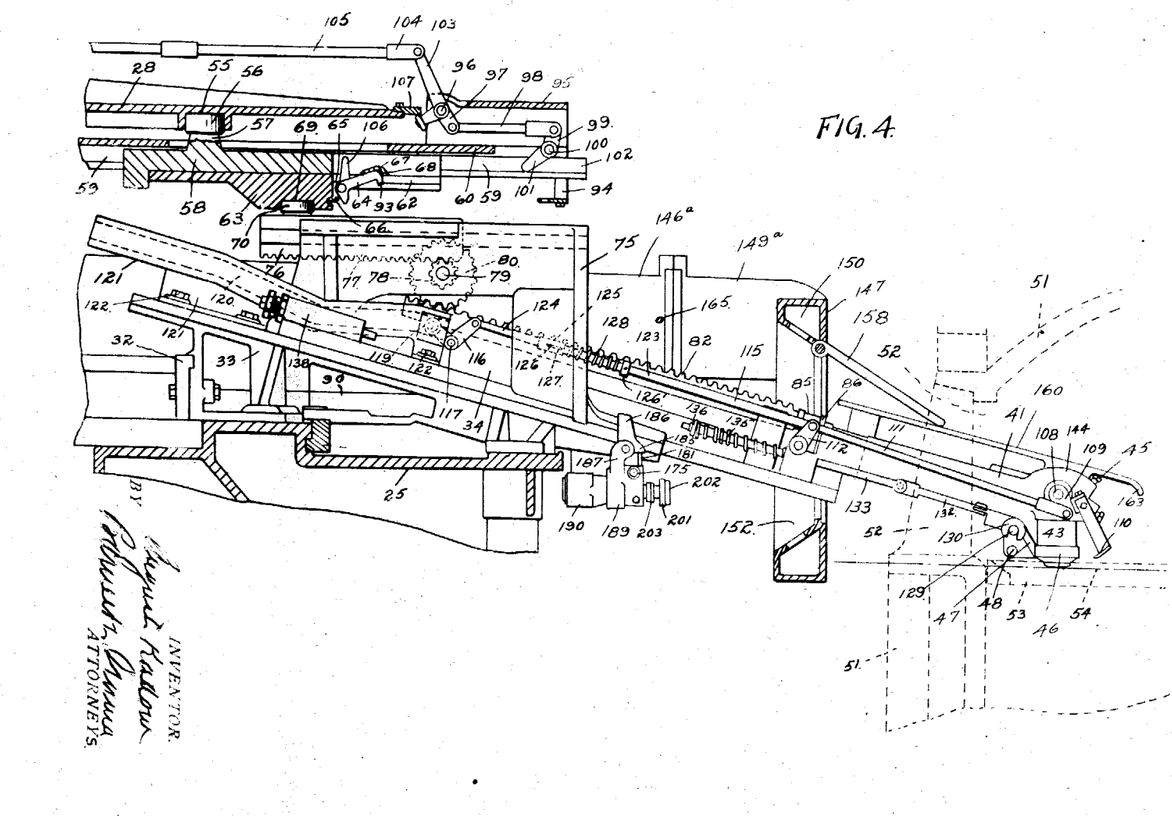
Fig. 4 is a view similar to Fig. 3, but with certain parts in elevation instead of in section, showing the ram projected into the glass furnace, which latter is indicated by dotted lines.

The central opening 148 in the hollow annular structure 147 is normally closed by a door 158 hinged to said structure by pintles 159. The door is pushed open by members 160, 160ª secured at their forward ends to the mold supports 44, 44ª by screws 161 and at their rear ends to the ram structure by screws 162 and the screws 39 above mentioned. The door opening devices are formed preferably by curved noses 163 which strike against the door (Fig. 3). The rearwardly extending portions of these devices provide slides for holding the door out of contact with the ram, as shown in Fig. 4.

Figures 13, 14:
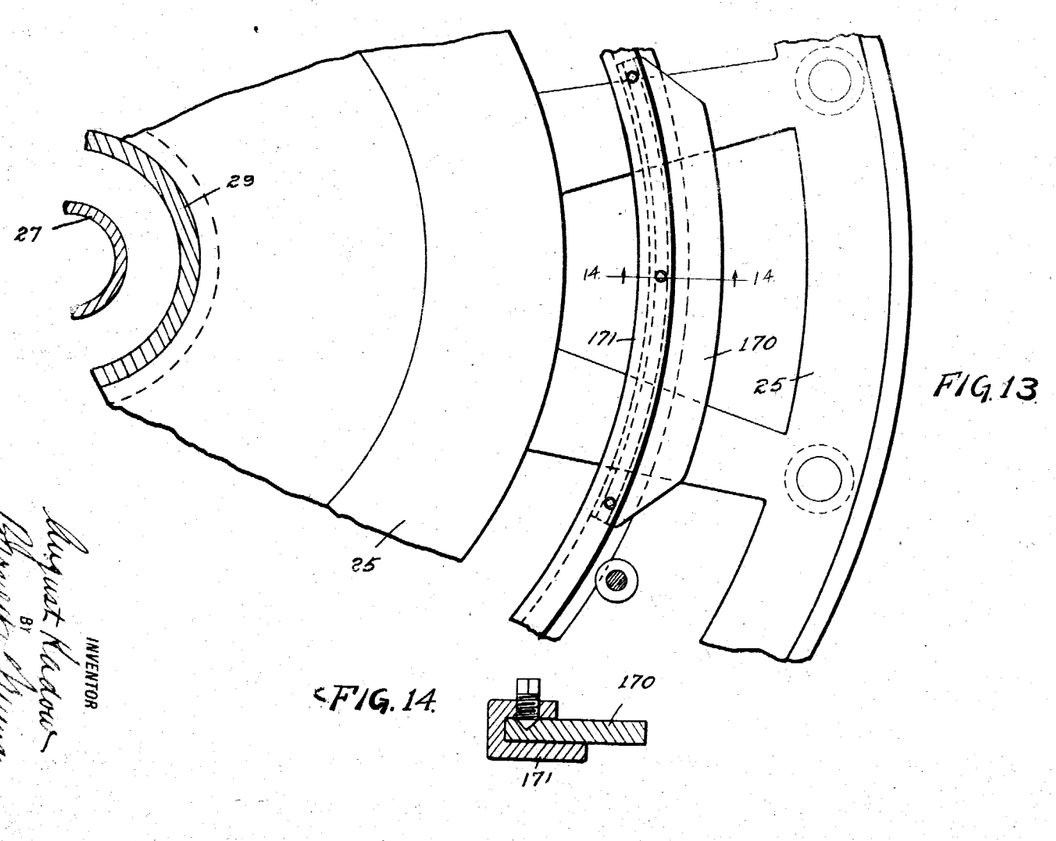
Fig. 13 is a fragmentary plan view showing the cam for controlling the air or other cooling fluid directed against the gathering mechanism through the hollow structure shown in the preceding two figures.
Fig. 14 is a detail section on line 14—14 of Fig. 13.

Arranged in the air trunks 146, 146ª are butterfly valves 164, 164ª (Figs. 1 and 2) on a shaft 165 provided with an arm 166 connected by a link 167 with a lever 168 pivoted to the side of air trunk 146 and carrying on its lower end a roller 169 adapted to engage with a cam 170 (Figs. 1, 13 and 14) fixed in a channeled member 171 secured to a part of the rotating structure 25 of the machine.

Fig. 1 shows the mold as opened and the blank 172 delivered to spindle 26. After this the spindle is moved away from its position under the gathering mold and cam 170 is so placed that the further rotation of the machine rocks lever 168 and opens the butterfly valves 164, 164ª, the latter being normally held in closed position by a coiled spring 173 interposed between lever 160 and a lug 174 formed on the hollow structure 147. The butterfly valves remain open until such time as the ram is again projected into the furnace to make a new gather.

In some cases it is desirable to inject water, or other cooling fluid directly against the interior surface of the upper mold section. 175 is a water pipe extending through the ram support 33 and provided with nozzles 176, 176ª (Figs. 7 and 8) arranged to direct streams of water into the upper sections of the two molds carried by the ram. One end of pipe 175 enters a valve casing 177 into the other side of which leads the water supply pipe 178. The interior of the casing is divided by partition 179 forming a seat for a valve 180, the stem 181 of which extends through a packing in the bonnet 182 of the valve casing and is provided with a collar 183 between which and the valve casing is arranged a coiled spring 184 which tends to keep valve 180 seated. The stem 181 is depressed to open the valve by a lug 185 formed on a rocking member 186 which is mounted on a fork 187 formed integrally with casing 177. The rocking member 186 is connected by link 188 with the lever 168 which controls the butterfly valves in the air trunks 146, 146ª. The valve casing 177 is supported on a bracket 189 (Fig. 8) rigidly connected with the ram support 33.

In order to cool the lower mold sections, and particularly the interior thereof, devices are provided, the same for both molds, one of which will now be described. Arranged on bracket 189 is a valve casing 190 (Fig. 7) into which leads air supply pipe 191. The casing is formed with a seat 192 for a valve 193 against which bears a coiled spring 194, the other end of which is held in place by the bonnet 195. The valve has a stem 196 threaded into a hollow sleeve 197, the bore of which communicates with the interior of casing 190 through ports 198. The opposite end of the plunger is threaded to receive a hollow stem 199 terminating in a perforated nozzle 200 and provided with an enlargement 201 which preferably is formed with a seat for a cushion 202. The stem 199 is susceptible of adjustment in sleeve 197, said adjustment being maintained by lock nut 203.

Figure 7:
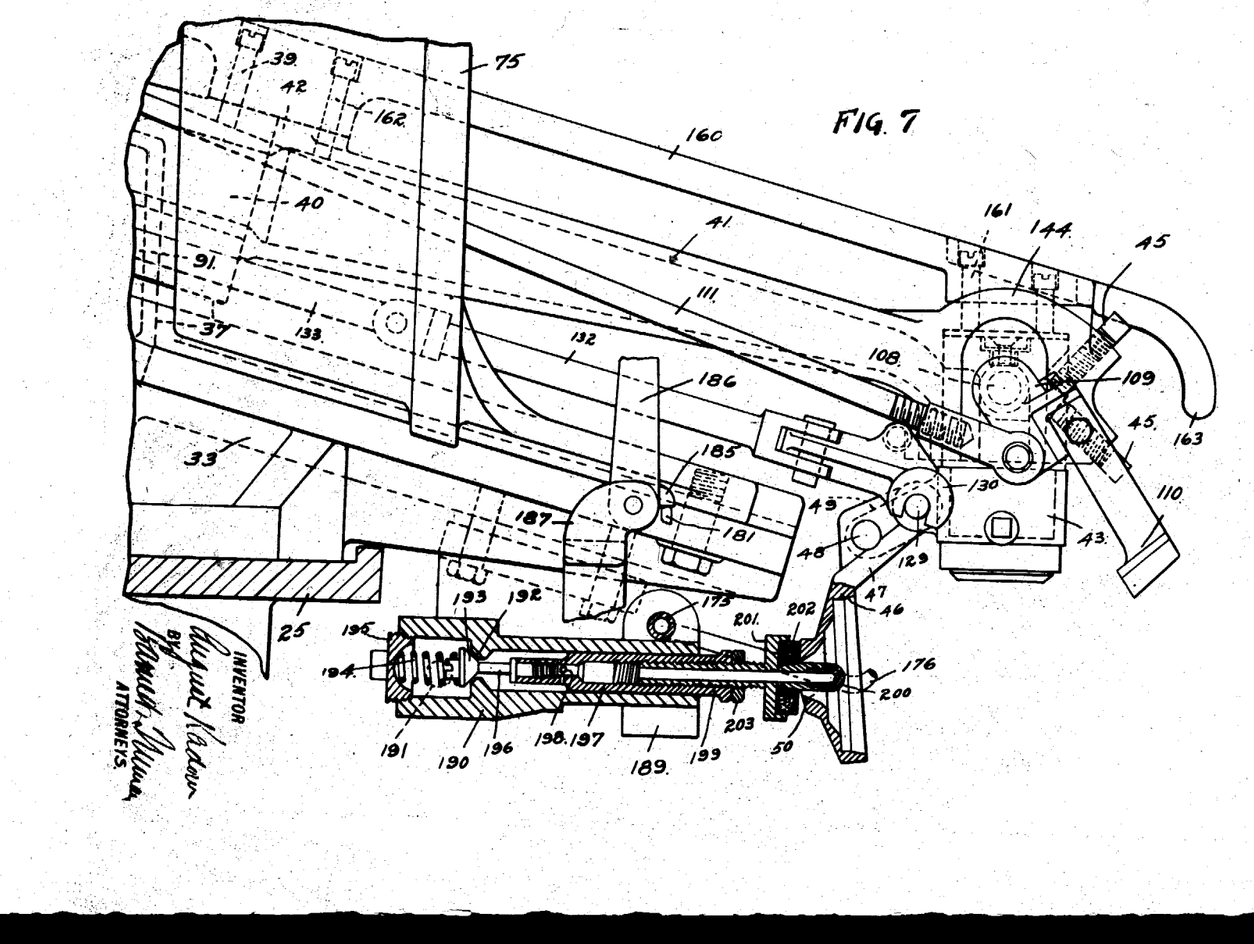
Fig. 7 is a detail view, partly in elevation and partly in section, of the end of the ram showing the mold in opening position.
Figure 8:
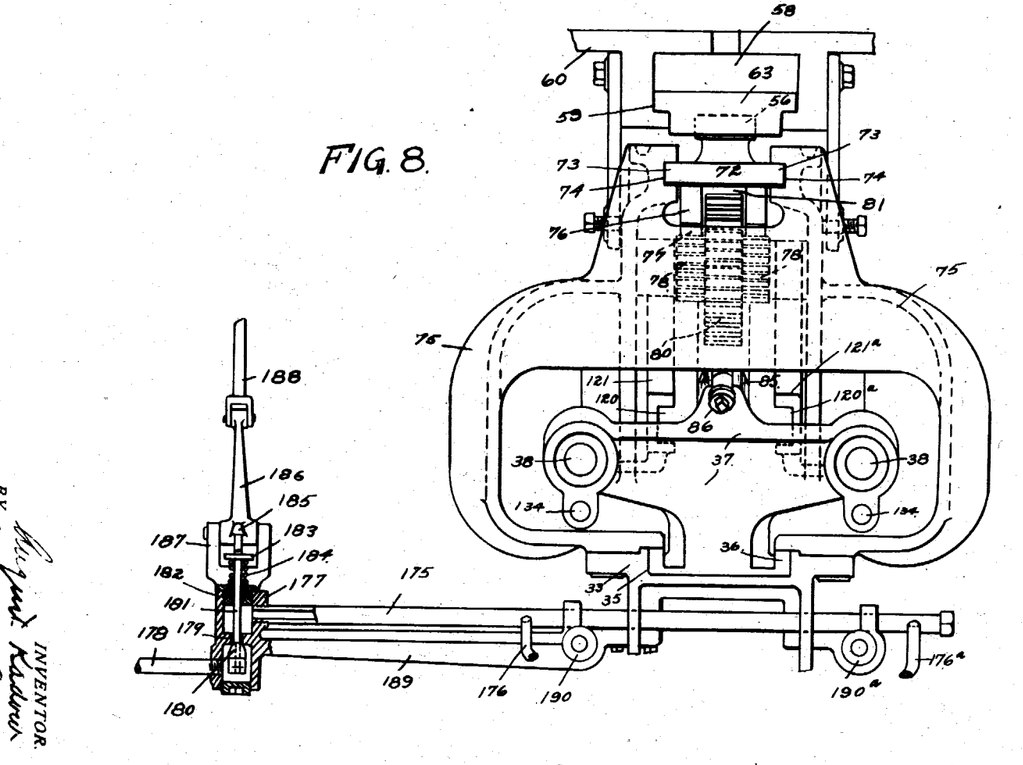
Fig. 8 is an end view of the ram and its support, omitting, however, the gathering molds and their tubular supporting elements.

The cushion 202 is arranged so that the lower mold section 46 will be thrust against it when moved to its open position, the nozzle 200 entering the gathering opening 50 in the bottom of the mold. The mold meets with the cushion 202 a trifle before it reaches the limit of its outward movement and as a result valve 193 is unseated and air thereby injected against the interior surface of the mold through the perforations of nozzle 200. The nozzle 200 also serves to clear the neck mold opening 50 if it should happen to be clogged.

Operation: When the ram is moved outwardly from the position shown in Fig. 3, by operation of the mechanism controlled by cam 25, the door opening devices 160, 160ª encounter door 158 and push the door out of the way to permit the movement of the ram into the working opening 52 of the glass furnace 51. The outward movement of the ram releases spring 135 which, acting on plunger 133, closes the lower mold section 46 against the upper mold section 43; a similar mechanism accomplishes a like result with respect to the mold on the other side of the ram. When the molds are brought into contact with the glass at the outer limit of movement of the ram, ports 88, 89 are in register (Fig. 5) and a vacuum is created in the molds which sucks up the charges of glass. The ram is then moved backwardly away from the furnace by reverse movement of the mechanism controlled by cam 28. This movement of the ram operates the cut-off knives through the mechanisms operated by cams 121, 121ª. The cut-off knives perform the same movements in reverse order on the out-stroke of the ram but these movements are, of course, idle. At the end of the in-stroke the lower mold sections are rocked away from the upper sections and the blanks of glass delivered to spindles 26 which, by rotation of the rotating frame 25 of the machine, have been brought into alinement with the molds.

The spindles move away from the molds and at the same time jets of air are directed against the end of the ram and the molds thereon from the perforations in the hollow shielding structure 147, the door 158 of which closes by gravity as soon as the ram passes backwardly through the opening in which the door is designed to cover. Jets of water are injected into the upper mold sections through nozzles 176, 176ª. These cooling fluids are controlled by mechanisms operated by cam 170. Each of the lower mold sections is moved to a position in which jets of air from nozzles 200 are directed against its interior surface, the valve 193, controlling the air employed in this connection, being unseated by pressure of the mold section against the structure attached to the stem of the valve.

I do not here claim any of the patentable mechanisms and combinations here shown which also appear in my pending application Serial No. 570,621, as the same are claimed in said application and in certain divisions thereof filed by me and now pending.

I claim:

1. The combination with a plurality of constantly traveling glass forming units, of a single gathering unit common to said forming units, and means for periodically and automatically projecting said gathering device at regular intervals into a glass furnace so as to make successive gathers directly from a body of glass therein and to deliver a gather successively to each of said forming units.

2. A single, coördinated mechanism comprising a gathering unit, a plurality of constantly traveling glass forming units, and motor driven means actuated in a pre-determined order and time to cause said gathering unit to be projected into a glass furnace and to make successive gathers directly from a mass of molten glass therein and to deliver such gathers to said gathering units in succession.

3. An automatic glass working machine comprising a stationary support, a gathering device operating in a fixed radial relation to said support, a traveling support carrying a plurality of glass forming units, and motor driven means actuated in a predetermined order and time to reciprocate said gathering device radially of said traveling support, whereby said gathering device is projected into a glass furnace and caused to make a succession of gathers direct from a molten mass of glass therein, and to cause said forming units to successively register with said gathering device and receive a gather therefrom.

4. An automatic glass working machine comprising a stationary support, a glass gathering unit supported thereby and having a fixed radial working position with relation to said support, a traveling support moving around said stationary support, and motor driven means actuated in a predetermined order and time to cause said gathering unit to be reciprocated radially of said traveling support so as to be moved into and out of a glass furnace, and to collect a gather of glass therefrom at regular intervals and to carry the same to a point of delivery, and to cause said forming units to successively receive a gather of glass from said gathering unit.

5. An automatic glass working machine comprising a stationary support, a gathering device operating in a fixed radial relation to said support from the gathering position to discharging position, a shield carried by said support and interposed between the discharging position of the gathering device and the point from which a gather is to be made, means coördinated with the movements of said gathering device whereby said shield is automatically removed from the path of travel of the gathering device during the gathering operation and is returned to its original position when the gathering device is withdrawn from its gathering operation, a plurality of glass-forming units, and means coördinated with the operations of the gathering device whereby each of the glass forming units is successively and in a regular order and time brought into register with the glass-gathering device and is caused to receive a gather of glass from the gathering device.

6. The invention as set forth in claim 5 embodied in a machine comprising mechanism whereby upon the closure of the shield a plurality of jets of cooling fluid are projected against heated parts of the gathering device.

7. The invention as claimed in claim 5, in combination with a glass furnace having a working opening in operative relation to the gathering device wherein the machine is provided with water-jacketed means for protecting the gathering device when at rest in non-gathering position and with means automatically actuated by the return of the gathering device to non-gathering position whereby parts of the gathering device heated during the gathering operation are cooled by jets of cooling fluid projected thereon.

8. In glass forming apparatus, the combination with a glass furnace, of an air trunk terminating in a substantially vertically arranged, approximately rectangular, hollow structure with a central opening therethrough and with its inner wall perforated, a reciprocating gathering device which is drawn through said opening when retracted from the furnace, and mechanism timed to operate when said gathering device is retracted for directing cooling fluid against the same through the perforations of said hollow structure.

9. In glass forming apparatus, the combination with a glass furnace, of an air trunk terminating in a substantially vertically arranged, approximately rectangular, hollow structure with a central opening therethrough and with its inner wall perforated, a reciprocating gathering device which is drawn through said opening when retracted from the furnace, mechanism timed to operate when said gathering device is retracted for directing cooling fluid against the same through the perforations of said hollow structure, a door to normally close said central opening, and means for opening said door to permit the movement through said opening of the gathering device.

10. In glass forming apparatus, the combination with a glass furnace, of an air trunk terminating in a substantially vertically arranged, approximately rectangular, hollow structure with a central opening therethrough and with its inner wall perforated, a reciprocating gathering device which is drawn through said opening when retracted from the furnace, mechanism timed to operate when said gathering device is retracted for directing cooling fluid against the same through the perforations of said hollow structure, a gravity-closed door arranged in said central opening, and means on the gathering device which opens said door to allow the gathering device to pass through said opening.

11. In glass forming apparatus, the combination with a glass furnace, of an air trunk terminating in a substantially vertically-arranged, approximately rectangular, hollow structure with a central opening therethrough and with its inner wall perforated, a reciprocating gathering device which is drawn through said opening when retracted from the furnace, means for supplying a cooling fluid under pressure to said hollow structure, a valve to control the flow of said fluid, and mechanism timed to open and close said valve during the intervals between successive outward movements of the gathering device.

12. In glass forming apparatus, the combination of a gathering device comprising an upper mold section, a lower mold section in hinged relation to the upper section so as to swing away from the same and provided in the bottom with an opening through which the glass is drawn in making a gather, and an element adapted to project into said opening when the lower section swings away from the upper section, said element comprising a nozzle whereby a cooling fluid may be forced against the interior of the lower mold section therethrough.

13. In glass forming apparatus, the combination with a glass furnace having a working opening, of a reciprocating glass gathering device movable into and out of said opening, a shield for protecting the gathering device from the heat of the furnace when retracted therefrom having an opening to permit the movements of the gathering device and formed with hollow, perforated walls, means for subjecting the gathering device to a cooling fluid directed against it from said perforations, and a door to close said opening which is moved out of the path of said gathering device on the out stroke of the latter.

14. In glass forming apparatus, the combination with a glass furnace having a working opening, of a reciprocating glass gathering device movable into and out of said opening, a shield for protecting the gathering device from the heat of the furnace when retracted therefrom having an opening to permit the movements of the gathering device and formed with hollow, perforated walls, means for subjecting the gathering device to a cooling fluid directed against it from said perforations, a door in said opening which is hinged at its upper edge, and means on said gathering device for opening said door.

15. In glass forming apparatus, the combination with a glass furnace having a working opening, of a reciprocating glass gathering device movable into and out of said opening, a hollow, annular structure through the central opening of which the gathering device moves to and from the furnace; the inner wall of said structure being formed with perforations through which a cooling fluid may be directed against the gathering device when in retracted position, a door to close said central opening, and means for opening said door at the out stroke of the gathering device.

16. In glass forming apparatus, the combination with a glass furnace having a working opening, of a reciprocating glass gathering device movable into and out of said opening, a hollow, annular structure through the central opening of which the gathering device moves to and from the furnace; the inner wall of said structure being formed with perforations through which a cooling fluid may be directed against the gathering device when in retracted position, a door in said opening which is hinged at its upper edge, and means on the gathering device for opening said door and slidably supporting the lower edge thereof during the movements of the gathering device to and from the furnace.

17. In glass forming apparatus, the combination of a gathering mold comprising an upper section and a lower section in hinged relation with the upper section and provided with a gathering opening, a nozzle adapted to discharge a cooling fluid, and mechanism for moving the lower mold section from the upper section to a position in which said nozzle projects into said gathering opening.

18. In glass forming apparatus, the combination of a gathering mold comprising an upper section and a lower section in hinged relation with the upper section and provided with a gathering opening, a nozzle adapted to discharge a cooling fluid, mechanism for moving the lower mold section from the upper section to a position in which said nozzle projects into said gathering opening, a valve to control the discharge of fluid from said nozzle, and means operated when the lower mold section is moved to its position adjacent the nozzle for opening said valve.

19. In glass forming apparatus, the combination of a gathering mold comprising an upper section and a lower section in hinged relation with the upper section and provided with a gathering opening, a nozzle adapted to discharge a cooling fluid, mechanism for moving the lower mold section from the upper section to a position in which said nozzle projects into said gathering opening, and a valve to control the discharge of fluid through said nozzle which is open by contact therewith of said lower mold section.

20. In glass forming apparatus, the combination of a gathering mold comprising an upper section and a lower section hinged thereto and provided with a gathering opening, mechanism for moving said lower mold section away from the upper section, a valve casing formed with a valve seat and adapted to be supplied with cooling fluid under pressure, a valve in said casing having a hollow stem communicating with the interior of the casing and terminating in a nozzle adapted to direct fluid against the interior of said lower mold section, and means actuated by the movement of the lower mold section for opening said valve.

21. In glass forming apparatus, the combination of a glass gathering mold comprising two sections, one of which is movable away from the other to open the mold, a nozzle directed toward the interior surface of the movable mold section when in open position, and means set in operation when the movable section is opened for directing a jet of cooling fluid against the interior surface of said movable mold section through said nozzle.

22. In glass forming apparatus, the combination of a glass gathering mold comprising two sections, one of which is movable away from the other to open the mold and is provided with a gathering opening in the bottom thereof, and means comprising a nozzle adapted to extend through said gathering opening for directing a jet of cooling fluid against the interior of said mold section.

23. In glass forming apparatus, the combination of a mold section having an opening therein, means for cooling said mold section comprising a nozzle through which a cooling fluid is discharged, a valve to control the discharge of said fluid, means for moving said mold section to a position in which the nozzle projects into the opening therein, and means operated by the movement of said mold section for unseating said valve.

24. In glass forming apparatus, the combination of a mold section having an opening therein, a valve casing, a valve in said casing formed with a tubular stem terminating in a nozzle, a valve seat within the casing dividing the interior thereof into a chamber adapted to communicate with a source of supply of cooling fluid under pressure, and a chamber which communicates with the interior of said valve stem, a spring tending to hold said valve against its seat, and means for moving said mold section into a position against said valve stem which unseats the valve and causes said nozzle to project through the opening in said mold section.

AUGUST KADOW.